Sept. 23, 1958        A. LODGE        2,853,264
SOLENOID VALVE
Filed April 13, 1953

Inventor
ALVIN LODGE
By Charles L. Loverchek  Attorney

United States Patent Office 2,853,264
Patented Sept. 23, 1958

2,853,264

SOLENOID VALVE

Alvin Lodge, Erie, Pa., assignor to Hays Manufacturing Company, Erie, Pa., a corporation of Pennsylvania Application April 13, 1953, Serial No. 348,205

2 Claims. (Cl. 251—76)

This invention relates to valves and more particularly to valves operated by electrical solenoids where the flow of water desired is small.

In solenoid valves used by electric clothes driers, drinking fountains, sprayers, and similar environments where a very small flow of water is required and in valves made up until the present time and with which I am familiar and which were operated by means of a plunger, it was not possible to operate the plunger directly by means of the electromagnetic force of the solenoid on the plunger without having pilot drives for the valve disk, incorporating pistons or diaphragms in the construction of the valve. This was chiefly due to the fact that orifices formed in valves of prior construction and design were not adapted to allow moderately large amounts of water to flow through a small orifice. Orifices incorporated in valves of previous design were so constructed as to create considerable turbulence in the liquid stream and consequent loss of head. Therefore, comparatively large orifices were required to obtain a given flow of liquid. Valves according to previous designs were often bulky in construction and required considerable space for their installation.

It is, accordingly, an object of this invention to overcome the above and other defects in previous valve constructions by providing a valve wherein the plunger will operate directly from the electromagnetic pull of the solenoid without the necessity of incorporating pilots, pistons, or diaphragms in the construction of the valve.

Another object of the invention is to provide a valve which will allow a comparatively large flow of water through a very small orifice.

A further object of the invention is to provide a water tube in an electromagnetic valve inserted after the orifice in the valve which will reduce the velocity of discharge and prevent turbulence in the water and consequent loss of head in the water.

A still further object of the invention is to provide a valve having an orifice larger than is practicable to use in previous designs of solenoid valves incorporating a hammer action or impact plunger.

Another object of the invention is to provide a plunger for use in a valve which is simple in construction and is equipped with a tip made of resilient material.

A still further object of the invention is to provide a needle for a plunger for use in a valve, which needle is spun into the plunger with sufficient play between the needle and plunger to allow the plunger itself to move and obtain a considerable velocity of movement before the needle is lifted from its seat.

A further object of the invention is to provide a novel arrangement of parts in a valve comprising a strainer and a shut off means wherein the strainer is located directly beside the valve.

Another object of the invention is to provide a valve comprising a plunger and a strainer wherein a minimum length of flow passage for fluid through the valve and strainer is provided.

A further object of the invention is to provide a valve which is economical to manufacture and efficient in use.

With the above and other objects in view, the present invention consists of the combination and arrangement of parts hereinafter more fully described, illustrated in the accompanying drawing, and more particularly pointed out in the appended claims, it being understood that changes may be made in the form, size proportions, and minor details of construction without departing from the spirit or sacrificing any of the advantages of the invention.

Figure 2:
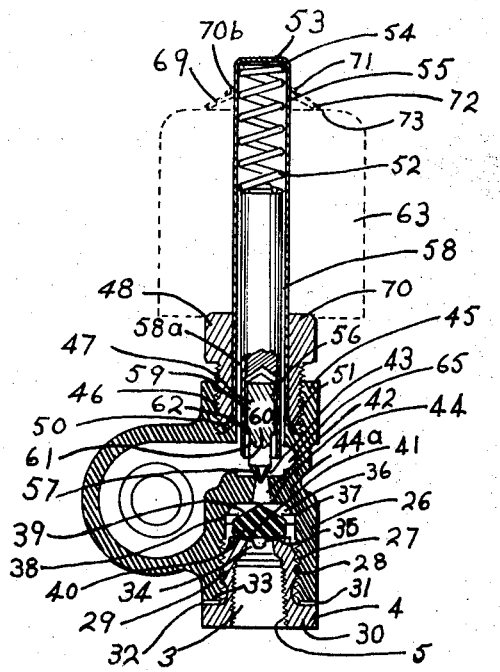
Fig. 2 is a cross sectional view taken on line 2—2 of Fig. 1.
Figure 1:
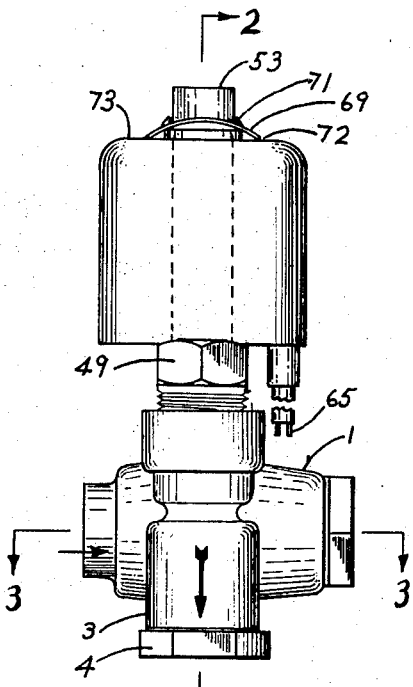
Fig. 1 is a side view of the valve according to my invention.
Figure 3:
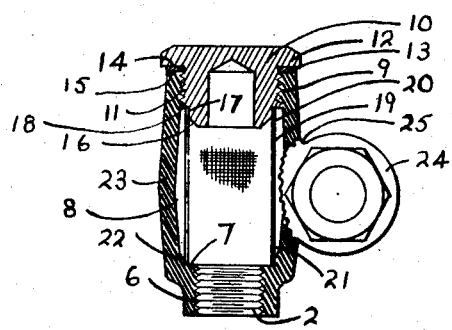
Fig. 3 is a cross sectional view of my valve taken on line 3—3 of Fig. 1 but viewed from an opposite direction from the section shown in Fig. 2 and having a part broken away to better illustrate the invention.
Figure 5:
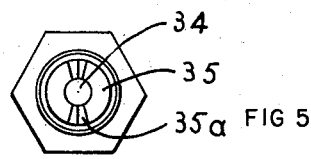
Fig. 5 is a detailed end view of the seat of the valve.
Figure 4:
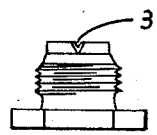
Fig. 4 is a side view of a plug according to the invention.
Figure 6:
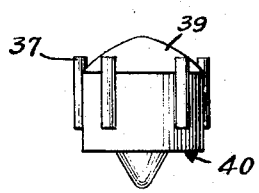
Fig. 6 is a side view of the flow control device according to the invention.
Figure 7:
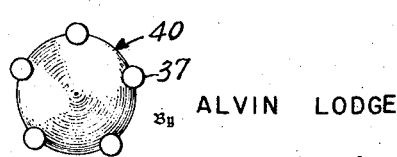
Fig. 7 is a top view of the flow control device.

Referring to the drawing, I show a valve having a body 1 with an inlet passage 2 and an outlet passage 3. The surface 4 around the outlet passage is hexagonal in shape to accommodate a wrench or other tool during the process of attaching the outlet passage to the threaded end of a pipe to engage the internal threads 5 in the outlet passage. The inlet 2 has internal threads 6 which are adapted to receive the threaded end of a pipe in the liquid line. The inside of the inlet passage has a shoulder 7 and an enlarged interior surface 8. The end opposite the inlet 2 has an internal thread 9 which receives a plug 10 which has external threads 11 adapted to engage the threads 9 on the inlet passage and an overhanging shoulder 12 is integral with the plug 10 which engages the washer 13 between the lower portion 14 of the plug and the upper surface 15 on the inlet passage. The plug 10 is tapered at 16 and has a cylindrical surface 17 and a shoulder 18. One end 20 of the cylindrical strainer 19 is slipped over the cylindrical surface 17 and abuts against the shoulder 18. The other end 21 of the strainer slides into the recess between the internal cylindrical surface 22 and abuts against the shoulder 7. It will be apparent that the strainer is held in place between the cylindrical surface 22 and abutting one end thereof against the shoulder 7 and the other end abutting against the shoulder 18 and engaging the surface 17.

Integral with the wall 23 of the inlet member, the wall 24 of the outlet member is attached. In other words, the walls 23 and 24 of the outlet member and the inlet member may be cast in one integral piece. The outlet end of the valve is internally threaded at 27 to receive the external threads 28 on the plug 29. The plug 29 has an overhanging edge 30 which has a shoulder 31 which engages a washer 32 to hold it in sealing engagement with the surface 33 of the end 26 of the outlet member. The plug 29 has a reduced size orifice 34 having a tapered seat 35 and radial slots 35a formed in the seat. A chamber 36 above the plug 29 has a shoulder 38 disposed at the upper side thereof. The flow control device 40 has spaced legs 37 fixed around its outside periphery to guide it in its movement in the chamber 36. The legs 37 are spaced above the lower end 41 so as not to interfere with the flow of liquid. It will be noted that the lower edge 41 of the flow control device will engage the peripheral edge of the seat 35 at low pressures and when a high pressure is introduced through the orifice, the cylindrical shaped flow control device 40 made of synthetic rubber or similar resilient material will collapse onto the seat 35 by compressive deformation due to the relative thickness of the flow control device 40 to its lateral dimension and will limit the flow through the valve.

The orifice 42 is formed in the partition 44a and converges downwardly from the end 43 to the end 44. This convergence is provided so that the turbulence of the fluid at the outlet end 44 of the orifice and the convex upstream side 39 of the control device 40 is disposed in alignment with the orifice and, therefore, the loss of pressure head therethrough, will be reduced. The upper edge of the orifice 42 is slightly tapered to reduce turbulence and provide a better seat for the cone tip 57.

The end 45 of the valve is internally threaded at 46 to receive the external threads 47 on the plug 48. The plug 48 has wrench receiving edges 49 to accommodate a wrench or other tool during the assembly of the device. A conical surface 50 is provided inside the top of the valve to engage the flared end 51 of the drawn bonnet 52 which is made of non-magnetic material and has the enclosed ends 53 which engage the upper edges 54 of the helical spring 55.

The rubber needle 56 has a conical tip 57 which is adapted to engage the surface 43 of the orifice 42 to stop the flow of fluid through the valve. The needle 56 loosely slides in the tubular plunger 58 which is made of magnetic material such as steel. In order to further facilitate the movement of the needle in the plunger, holes 58a are drilled to allow fluid trapped above the needle in the bonnet to escape. The outer edges 59 of the needle 56 freely slide in the magnetic plunger 58. The end 60 of the plunger 58 is spun together so that the lower end of the plunger has a reduced size portion 61 which engages the needle 56 at the shoulder 62. It will be noted that when the solenoid 63 is excited by attaching the wires 65 to a source of electric power, the magnetic plunger 58 will be pulled upwardly against the force of the helical spring 55. This will cause the needle 56 to slide downwardly in the tubular plunger 58 until the shoulders 62 engage the spun end 60 of the plunger, at which time a continued movement of the plunger 58 will lift the tip 57 of the plunger out of engagement with the surface 43 of the orifice 42, thereby allowing the plunger to flow through the inlet passage 2, through the strainer 19 into the chamber 36, through the orifice 42, past the flow control member 40, and out through the discharge passage 3 and into the pipe attached to the threaded end 5.

It will be noted that when the solenoid is excited as above, the tubular plunger 58 will have obtained a considerable velocity in the upward direction before the spun end 60 engages the shoulders 62 on the plunger to lift the needle from its seat at the orifice.

The valve can be used without the flow control device 40 by removing the plug 29 and, thereby, allowing the device 40 to be removed. Then a pipe line can be threadably connected to the threads 28 of the end 26. The pipe engaging the internal threads 27 will be one size larger than the pipe which has been attached to the end at the threads 5.

The solenoid 63 is held down against the upper surface 70 of the plug 48 by means of the ferrule 69 which is bored at 70b to receive the outside surface of the bonnet 52 and has the stamped out members 71 which also engage the outer surface of the bonnet. The lower edges 72 engage the upper edge 73 of the solenoid.

From the design of the valve, it will be apparent that a minimum length of flow of fluid is provided since the fluid will flow through the inlet passage 2, through the strainer 19, through the orifice 42, and past the flow control device 40 to the outlet member 3.

In the foregoing specification, I have set forth the invention in its preferred forms but I am aware that the structure shown is capable of modification within a range of equivalents without departing from the invention which it is to be understood is broadly novel as is commensurate with the appended claims.

What I claim is:

1. A valve comprising a body member, an inlet passage and an outlet passage in said valve body, a partition between the inlet and outlet passage, an orifice formed in the partition, said orifice diverging outwardly toward the outlet passage, a resilient needle engaging a seat on the inlet side of said orifice whereby the flow of fluid through said orifice is stopped, means to move said needle out of engagement with said seat to allow fluid to flow through said orifice, said means comprising a plunger connected to said needle and a solenoid actuating said plunger, said plunger and said needle being connected by said needle being inserted into a hollow in said plunger and the ends of said plunger being spun to overlap a portion of said needle, said needle being slidable in said plunger whereby said plunger moves a substantial distance before said needle is moved, a plug fitted into said outlet passage, an orifice in said plug, and a flow control device disposed in alignment with said orifice on the outlet side thereof, said flow control device comprising a tapered concave seat on said plug around said orifice, radial slots formed in said tapered seat, and a resilient cylindrically shaped, relatively thick member having a convex surface on the upstream side thereof, the center of said convex surface being disposed generally along the center line of said orifice, said flow control device engaging said tapered seat and adapted to be deformed by compressive deflection into said slots and into said concave seat as the liquid pressure through the valve increases.

2. The valve recited in claim 1 wherein said resilient cylindrically shaped member has spaced legs fixed thereto around its outside periphery to guide it in said valve.

References Cited in the file of this patent

UNITED STATES PATENTS

| | | |
|---|---|---|
| 1,820,356 | Lindstrom | Aug. 25, 1931 |
| 2,050,430 | Erickson | Aug. 11, 1936 |
| 2,114,961 | Gille | Apr. 19, 1938 |
| 2,223,986 | Eaton | Dec. 3, 1940 |
| 2,327,542 | Matteson | Aug. 24, 1943 |
| 2,489,542 | Rosenblum | Nov. 29, 1949 |
| 2,503,901 | Chace | Apr. 11, 1950 |
| 2,562,315 | Kempton | July 31, 1951 |
| 2,598,187 | Meyer | May 27, 1952 |
| 2,607,369 | Miller | Aug. 19, 1952 |
| 2,608,214 | Renick | Aug. 26, 1952 |
| 2,727,715 | Tuthill | Dec. 20, 1955 |
| 2,762,397 | Miller | Sept. 11, 1956 |

FOREIGN PATENTS

| | | |
|---|---|---|
| 191,444 | Great Britain | Jan. 8, 1923 |